United States Patent [19]
Daly et al.

[11] Patent Number: 6,011,080
[45] Date of Patent: Jan. 4, 2000

[54] NON-HAZING UV CURABLE POWDER COATINGS CONTAINING CRYSTALLINE RESINS

[75] Inventors: Andrew T. Daly, Sinking Springs; Jeno Muthiah, Wernersville; Richard P. Haley, Reading; Owen H. Decker; Eugene P. Reinheimer, both of Wyomissing; Matthew B. Snyder, Coatesville, all of Pa.

[73] Assignee: Morton International, Inc., Chicago, Ill.

[21] Appl. No.: 09/136,184

[22] Filed: Aug. 19, 1998

[51] Int. Cl.$^7$ ........................................................ C08F 2/46
[52] U.S. Cl. ........................ 522/107; 522/104; 522/106; 522/108; 522/109; 522/170; 522/174; 522/179; 522/93; 428/480; 427/180
[58] Field of Search .................................. 522/104, 106, 522/107, 109, 142, 108, 170, 174, 179, 93, 97; 427/180; 428/480; 525/42, 227

[56] References Cited

U.S. PATENT DOCUMENTS

| | | | |
|---|---|---|---|
| 3,919,352 | 11/1975 | Iwasawa et al. | 525/162 |
| 3,988,288 | 10/1976 | Yamauchi et al. | 523/436 |
| 4,859,760 | 8/1989 | Light, Jr. et al. | 528/45 |
| 4,973,646 | 11/1990 | Witzeman et al. | 528/45 |
| 4,988,793 | 1/1991 | Barbee et al. | 528/272 |
| 5,019,636 | 5/1991 | Lapin et al. | 526/301 |
| 5,160,792 | 11/1992 | Barbee et al. | 428/480 |
| 5,168,110 | 12/1992 | Elshout et al. | 525/438 |
| 5,321,063 | 6/1994 | Shimada et al. | 524/37 |
| 5,334,455 | 8/1994 | Noren et al. | 428/413 |
| 5,414,058 | 5/1995 | Ono et al. | 525/523 |
| 5,439,896 | 8/1995 | Ito et al. | 525/107 |
| 5,635,548 | 6/1997 | Kittle et al. | 525/440 X |
| 5,639,560 | 6/1997 | Moens et al. | 428/482 |
| 5,710,214 | 1/1998 | Chou et al. | 525/124 |
| 5,740,893 | 4/1998 | Yamamoto | 192/45 |
| 5,763,099 | 6/1998 | Misev et al. | 428/482 |
| 5,811,198 | 9/1998 | Freriks et al. | 428/482 |
| 5,922,473 | 7/1999 | Muthiah et al. | 428/480 |

FOREIGN PATENT DOCUMENTS

| | | |
|---|---|---|
| 0 636 669 | 1/1995 | European Pat. Off. . |
| 636669 | 1/1995 | European Pat. Off. . |
| 96/01283 | 1/1996 | WIPO . |

OTHER PUBLICATIONS

S. Udding–Louwrier et al., Characteristics and Performance of Radiation Curable Powder Coatings, RadTech '98 Proceedings, pp. 106–110, Apr. 1998.

K.M. Biller et al., UV Curable Powder Coatings: The Perfect Marriage of Compliant Coatings, Rad Tech '96 Proceedings, vol. 1, pp. 437–445, Apr. 1996.

*Primary Examiner*—James J. Seidleck
*Assistant Examiner*—Sanza L. McClendon
*Attorney, Agent, or Firm*—Steven C. Benjamin; Gerald K. White

[57] ABSTRACT

This invention provides a UV curable powder coating composition comprising a particulate blend of a non-crystalline unsaturated polyester base resin, a crystalline unsaturated crosslinker resin co-polymerizable with the base resin, and a photoinitiator, that exhibits reduced or eliminated hazing in the cured coating formed therefrom upon being cured at low temperatures demanded by certain heat sensitive substrates. This is accomplished by incorporating in the powder composition a recrystallization inhibitor which is comprised of a crystalline epoxy resin. When this powder blend is melted for curing, all of the crystalline resin species tend to separate and recrystallize out of the molten powder slower and less completely than they do in the absence of the recrystallization inhibitor. This prevents a visible haze from quickly developing on the surface of the molten coating before the coating can be cured with UV radiation.

22 Claims, No Drawings

NON-HAZING UV CURABLE POWDER COATINGS CONTAINING CRYSTALLINE RESINS

FIELD OF THE INVENTION

This invention relates to ultraviolet (UV) radiation curable powder coating compositions. More particularly, this invention relates to UV curable powder coating compositions containing cyrstalline resins adapted to prevent hazing in the coating formed therefrom when cured at low temperatures.

BACKGROUND OF THE INVENTION

Powder coatings have gained considerable popularity in recent years over liquid coatings for a number of reasons. Powder coatings are virtually free of harmful fugitive organic solvents and, therefore, give off little, if any, volatiles during curing. This eliminates solvent emission problems and creates a healthier environment for workers employed in the coating operations. Powder coatings also improve working hygiene, as they are in dry solid form and have no messy liquids associated with them which adhere to workers' clothes and coating equipment. They are relatively non-toxic as well and can easily be swept up in the event of a spill without requiring special cleaning and spill containment supplies. Another benefit is that they are virtually 100% recyclable. The oversprayed powders are normally reclaimed and fed back into the original powder feed during the coating operation, leading to high coating efficiencies and minimal waste. Yet, despite such advantages, traditional thermosetting powder coatings have not been suited for coating heat sensitive substrates, since the temperatures at which these powders must be cured are usually higher than the heat sensitive substrate can withstand.

With the increased desire to coat heat sensitive parts with powder coatings and realize the foregoing benefits, recent emphasis has been placed on developing powders that permit polymerization or curing at lower temperatures. One class of low temperature-cure powder coatings recently developed for heat sensitive substrates are UV curable powder coatings. Such UV curable powders can be formulated to melt-flow and cure and produce desired smooth glossy coatings at much lower temperatures than had ever been possible with traditional thermosetting chemistry, which is primarily due to the curing reaction being initiated solely by ultraviolet radiation rather than heat. The UV curing mechanism also enables production of the powders in traditional melt-blending equipment and storage at room temperature without triggering unwanted prereaction.

UV curable powders are typically prepared from solid unsaturated non-crystalline base resins, solid unsaturated non-crystalline crosslinker resins, solid photoinitiators, flow additives, other performance-enhancing additives, and optional pigments and inert fillers. It is also common to replace some or all of either the base or crosslinker resin with a crystalline material, as taught, for example, in EP 0 636 669 to DSM. One UV powder coating from DSM that is presently preferred employs a blend of a non-crystalline base resin and a co-reactive crystalline crosslinker resin. Specifically, it comprises a stoichiometric blend of a solid, relatively polar, unsaturated amorphous (non-crystalline) polyester base resin with fumarate or maleate unsaturations and a glass transition temperature (Tg) of about 125° F. (the Tg being sufficiently high for conventional melt-processing and blocking resistance but still low enough for desired low temperature melt-flow), and a solid, somewhat incompatible, relatively non-polar, crystalline divinyl ether urethane crosslinker resin with a melting point (Tm) of about 195–230° F. (the Tm being above the Tg of the base resin and also above traditional melt-processing temperatures to avoid destruction of intact crystal structures during processing and attendant loss in melt-processing efficiency as well as blocking resistance), together with a solid photoinitiator, flow control agent, and optional pigments. The presence of crystalline ingredients, in particular, has been found highly desired because the powders will exhibit low melt viscosity and excellent flow out behavior during the initial melting stage of the coating process, allowing the powders to readily coalesce into smooth molten coating films which upon subsequent UV curing develop into exceptionally smooth coatings with desired glossy appearance.

However, one drawback with the use of crystalline materials, particularly crystalline crosslinker resins, having such high melting points (Tm) is that in order to obtain cured coatings with desired smooth glossy appearances, the molten coating must be UV cured at temperatures above the recrystallization point of the crystalline component. If the temperature of the molten coating after flow out is allowed to drop below the recrystallization temperature prior to UV curing, which can happen during transfer of the coated part from the melting to UV curing operation and/or as a result of the coated part having a variable mass, the cured coating will have an undesirable haze or blush on the surface with attendant loss in gloss and smoothness. The haze results as the crystalline resin component separates out and migrates to the surface of the coating where it recrystallizes back into intact crystal structures. This imparts to the coating a cloudy, rough, matte appearance characteristic of crystalline resins. While this is desirable when making low gloss coatings, it becomes troublesome when trying to control hazing and obtain higher gloss films at low temperatures. Moreover, with increased demand to coat heat sensitive parts that can only withstand temperatures near the recrystallization point of the crystalline ingredient, there is a need to provide a non-hazing UV curable powder coating that can be cured at such low temperatures and still produce a uniform haze-free smooth glossy finish over the part.

The limitations of traditional UV curable powders containing a crystalline resin can be best seen when trying to coat assembled electric motor casings which house a number of heat sensitive components, including working parts and electric circuitry associated therewith. To avoid damaging such components, the melt-flow and curing temperatures must be kept at levels that are only slightly above the recrystallization point. To further complicate the matter, these motor casings tend to have a variable mass. During coating, as the powder is melted at the desired conditions for curing, the heavier mass sections create heat sinks and cause the temperature of the molten coating in these sections to drop below the recrystallization temperature, while in other sections the coating temperature is kept above the recrystallization point. As a result, the cured coatings produced therefrom have an unacceptable mottled appearance due to the haze appearing around the heavier mass sections, rather than having a consistent smooth glossy coating across the part.

To overcome the hazing and mottling problem, it is possible to use non-crystalline resins alone which do not recrystallize. However, in order to achieve adequate flow out at the low temperatures suited for heat sensitive substrates, the Tg of the non-crystalline resins must be lowered considerably, which would render the powders physically unstable and susceptible to blocking or sintering during storage at room temperature. Powders that block are extremely difficult to meter and spray during the coating operations and lead to inconsistent spray patterns and defects in the coatings. Reducing the amount of crystalline resin, particularly the crystalline crosslinker resin, to levels at which recrystallization does not occur (i.e., below 10 wt. % of the resin system) has also been tried, but at such low levels the powders exhibit poor flow out at low temperatures and produce incompletely cured coatings with severely textured appearances.

It would be desirable to provide an improved UV curable powder coating composition containing crystalline resins adapted to prevent hazing in the coating formed therefrom when cured at low temperatures.

SUMMARY OF THE INVENTION

It is, therefore, a primary object of this invention to provide a UV curable powder coating composition containing crystalline resins that do not suffer from the forgoing drawbacks.

It is another object of this invention to provide a UV curable powder coating composition containing crystalline resins adapted to prevent hazing in the coating formed therefrom when cured at low temperatures.

It is related object of this invention to provide a UV curable powder coating composition containing crystalline resins adapted to prevent mottling and impart visually consistent gloss and smoothness in the coating formed therefrom when cured over a broad range of high and low temperatures.

It is a further object of this invention to provide a UV curable powder coating composition of the aforesaid character that is melt-processable, storage stable chemically as well as physically, exhibits a low flow viscosity when melted for curing, and possess the ability to be melt-flowed and cured at low temperatures suited for heat sensitive substrates, all without detracting from the smoothness, gloss, and overall quality of the coating film produced therewith.

In accordance with a broad aspect of this invention, there is provided a melt-processable, storage-stable, low temperature flowable, UV curable powder coating composition containing crystalline resins that exhibits reduced or no hazing in the coating formed therefrom when cured at low temperatures, which comprises a film-forming particulate blend of: A) an unsaturated base resin; B) an unsaturated crosslinker resin co-polymerizable with the base resin; and, C) a photoinitiator, wherein the combination of components A) plus B) comprises a blend of a crystalline and non-crystalline resin, and the improvement wherein the powder coating composition comprises D) a recrystallization inhibitor that effectively inhibits recrystallization of the crystalline resin after the powder composition is melted for curing and thereby reduces or eliminates hazing in the cured coating formed therefrom.

In accordance with a preferred aspect of this invention, there is provided a melt-processable, storage stable, UV curable powder coating composition containing crystalline resins that is melt-flowable at low temperatures suited for preservation of heat sensitive substrates, e.g., 170° F.–300° F., and exhibits reduced or no hazing in the coating formed therefrom when cured at low temperatures, e.g., down to 170° F. or lower, which comprises a film-forming particulate blend of: A) a non-crystalline unsaturated polyester resin, preferably a non-crystalline unsaturated polyester with maleate or fumarate unsaturations and a Tg above about 90° F. up to about 150° F.; B) a crystalline vinyl ether functionalized crosslinker resin co-polymerizable with the base resin, preferably a crystalline vinyl ether terminated urethane oligomer with a Tm above about 180° F. up to about 300° F.; C) a photoinitiator; and the improvement wherein the composition contains D) a crystalline epoxy resin which serves as a recrystallization inhibitor, preferably a crystalline epoxy oligomer compatible with both A) and B) and with a Tm above about 180° F. up to about 300° F., wherein incorporation of said recrystallization inhibitor D) reduces or eliminates hazing in the cured coating formed therefrom.

DETAILED DESCRIPTION OF THE PREFERRED EMBODIMENTS

Throughout this specification, all parts and percentages specified herein are by weight unless otherwise stated. Herein, the base resin A) plus crosslinker resin B) plus recrystallization inhibitor D) are considered to be the "resin system" and equal to 100 parts. Levels of other components are calculated as parts relative to 100 parts of the resin system ("phr"). Also herein, "glossy" or "high gloss" means gloss levels of 50 or above on a 60° Gardner-Haze Gloss scale. Further herein, "non-crystalline" refers to amorphous materials, and "crystalline" includes crystalline as well as semi-crystalline materials. Lastly, "recrystallization temperature" or "recrystallization point" refers to the temperature at which the crystalline resin component separates and recrystallizes out of the powder composition after being melted for curing.

The base resin A) is preferably comprised of at least one unsaturated polyester resin having at least one ethylenic unsaturation site per molecule. The unsaturated polyester resins can be prepared conventionally by condensation of one or more ethylenically unsaturated polyfunctional carboxylic acids (or their anhydrides) having carboxyl functionalities of 2 or greater with one or more polyhydric alcohols having hydroxyl functionalities of 2 or greater. While the unsaturation is typically supplied by the carboxylic acid, it is also possible to supply it through the alcohol. Moreover, the ethylenic unsaturation may be provided in the polymer backbone or at the end of the chain. If it is supplied at the chain end, ethylenically unsaturated monocarboxylic acids (or their esters) are employed in the condensation reaction. Also, whether the unsaturated polyester is carboxyl- or hydroxy-terminated will depend upon the —OH/—COOH ratio employed the monomer mixture. While these saturated reactivities generally do not participate in the curing reaction which proceeds through the unsaturated groups, they are often used to achieve desired chemical and mechanical properties.

Examples of suitable ethylenically unsaturated polyfunctional carboxylic acids (or their anhydrides) include maleic anhydride, fumaric acid, itaconic anhydride, citraconic anhydride, mesaconic anhydride, aconitic acid, tetrahydrophthalic anhydride, nadic anhydride, dimeric methacrylic acid, etc. Maleic anhydride, fumaric acid, or their mixtures are generally preferred because of economic considerations. Examples of suitable monofunctional acids employed for chain end unsaturation include acrylic acid, methacrylic acid, etc.

Often, polyfunctional saturated and aromatic acids are employed in conjunction with the polyfunctional unsaturated acids to reduce the density of the ethylenic unsaturation and provide the desired chemical and mechanical properties to the coating. Examples of suitable saturated and aromatic polycarboxylic acids (or their anhydrides) include adipic acid, succinic acid, sebacic acid, malonic acid, glutaric acid, cyclohexane dicarboxylic acid, dodecane dicarboxylic acid, phthalic anhydride, isophthalic acid, terephthalic acid, tetrahydrophthalic acid, hexahydrophthalic acid, trimellitic acid, pyromellitic anhydride, etc.

Examples of suitable polyhydric alcohols include ethylene glycol, diethylene glycol, triethylene glycol, propanediol, butanediol, neopentyl glycol, cyclohexanedimethanol, hexanediol, 2-n-butyl-2-ethyl-1,3-propanediol, MP Diol, dodecanediol, bisphenol A, hydrogenated bisphenol A, trimethylol propane, pentaerythritol, etc.

The unsaturated polyester resins can be formulated to have either a crystalline or amorphous microstructure. According to this invention, it is preferable that the resin system of the UV curable powders contain at least about 10 wt. % reactive crystalline material to impart desired low flow viscosity when melted for curing. It is well known in the art that certain alcohol and acid monomers can impart crystallinity to the unsaturated polyesters. For example, symmetrically substituted linear monomers or cyclic monomers or their mixtures are generally used to form crystalline polyesters. Examples of typical dihydric alcohols that are known to promote crystallinity include ethylene glycol, butanediol, hexanediol, and cyclohexane dimethanol. Examples of typical dicarboxylic acids that are known to do the same include terephthalic acid, adipic acid, dodecane dicarboxylic acid, and cyclohexane dicarboxylic acid.

Typically, only solid unsaturated base resins A) are of interest in powder coatings. Solid unsaturated polyester resins typically have a weight average (Mw) molecular weight ranging between about 400 and 10,000, and preferably between about 1,000 and 4,500.

The unsaturated polyesters typically have a degree of unsaturation, preferably fumarate or maleate unsaturation, between about 2 and 20 wt. %, and preferably between about 4 and 10 wt. %.

If the unsaturated polyesters are hydroxyl-functionalized, then the hydroxyl number is usually from about 5 to 100 mg of KOH/gram of resin. If the unsaturated polyester is acid-functionalized, then the acid number is usually from about 1 to 80 mg of KOH/gram of resin.

In a preferred embodiment, the base resin A) comprises a solid, relatively polar, non-crystalline unsaturated polyester resin with maleate or fumarate unsaturations. Accordingly, the reactive crystalline material is preferably supplied by the crosslinker resin B).

Generally, all of the non-crystalline resins useful herein should have a glass transition temperature (Tg) higher than 90° F., preferably in the range of about 110 to 150° F., which is sufficiently high for conventional melt-processing and for the powders to remain solid and not block or sinter during storage at room temperature. Yet, the Tg is still low enough so that the powders pass their softening point and flow freely at temperatures needed to preserve heat sensitive substrates, usually between about 170° F. and 300° F., and preferably between about 170° F. and 250° F.

The unsaturated base resins A) work best in combination with co-polymerizable crosslinker resins B) (otherwise known as curing agents) having ethylenic unsaturation, and preferably having two sites of unsaturation per molecule. Examples of such crosslinker resins include oligomers having ethylenically unsaturated vinyl ether, vinyl ester, allyl ether, allyl ester, acrylate or methacrylate groups, although the vinyl ether groups are generally preferred. These materials are usually available as crystalline resins.

Examples of suitable vinyl ether crosslinker resins include crystalline divinyl ether terminated urethane oligomers. This crystalline oligomer can be prepared by well known techniques, such as by reacting hydroxyl-functional vinyl ethers, such as hydroxybutyl vinyl ether, with crystalline diisocyanates, such as hexamethylene diisocyanate, hydrogenated methylene bis (cyclohexyl) diisocyanate, or biurets or uretdiones thereof. Another suitable vinyl ether crosslinker is a crystalline vinyl ether terminated ester oligomer. This crystalline material can be prepared by conventional methods as well, such as by the condensation of hydroxyl-functional vinyl ethers, such as hydroxybutyl vinyl ether, with crystalline carboxylic acids (or their anhydrides), such as phthalic anhydride.

Other suitable crosslinkers include resins having acrylate or methacrylate groups, such as dimethacrylate terminated urethanes. Again, these materials are usually crystalline resins which can be formed conventionally by reacting hydroxyl-functional (meth)acrylates, such as hydroxyethyl methacrylate and hydroxypropyl methacrylate, with crystalline isocyanates. Allyl ester crosslinkers are also commonly employed, such as the reaction product of allyl alcohol and crystalline carboxylic acids (or their anhydrides), typically phthalic anhydride. Standard crystalline allyl ether crosslinkers include the reaction product of an allyl ether, such as allyl propoxylate, and a crystallizing hydrogenated methylene diisocyanate.

The crosslinker resins B) of particular interest herein are solid materials as well because good powder stability and melt-processability is more easily achieved. The solid crosslinker resins typically have a weight average (Mw) molecular weight ranging between about 200 and 1,000, and preferably between about 300 and 800.

Of course, if these resins are liquids, as with any of the other materials employed in the UV curable powder other than the base resin, they can be converted to solid by absorption onto inert silica-type filler, such as fumed silica, before use, as is well known in the art.

In a preferred embodiment, the crosslinker resin B) comprises a solid, relatively non-polar, crystalline vinyl ether terminated urethane resin. As described above, the reactive crystalline ingredient is preferably supplied by the crosslinker resin B), with the base resin A) preferably supplying the reactive non-crystalline material.

Generally, all of the crystalline resins useful herein should have a melting point (Tm) higher than the Tg of the non-crystalline resins, and preferably higher than 180° F. up to about 300° F. This allows for efficient melt-processing of the powders using conventional equipment and at the same time ensures that the crystalline structures remain intact after melt-processing, which gives the powders the desired powder stability and blocking resistance. Moreover, the Tm is still below the flow temperature required for preservation of heat sensitive substrates.

It will be appreciated by a person of ordinary skill in the art that the relative amounts of unsaturated base resin to unsaturated co-polymerizable crosslinker resin in the UV curable powder coatings will depend on the choice of materials employed. Usually, such materials are employed in stoichiometric equivalent amounts to allow crosslinking to proceed to substantial completion, although excess of either can be used if desired. In general, if the crosslinker is a vinyl ether terminated urethane oligomer and the base resin is an unsaturated polyester with maleate or fumarate unsaturations, as preferred, the crosslinker is used in an amount ranging from 0.5–1.5 equivalents of the vinyl ether unsaturation to 1.0 equivalent of polyester unsaturation, preferably 1.0 to 1.0 equivalents.

To obtain the desired low viscosity melt-flow behavior at temperatures between 170° F. and 300° F., preferably between 170° F. and 250° F., the amount of crystalline resin, whether supplied by the base resin A) or crosslinker resin B), present in the UV curable powders generally ranges between about 10 and 50 wt. % of the total amount of A) plus B), and preferably between about 15 and 25 wt. %, with the balance being non-crystalline resin. Below about 10 wt. %, desired flow behavior at the lower melt temperatures generally cannot be attained. Above about 50 wt. %, recrystallization rates generally cannot be controlled effectively.

Standard free-radical photoinitiators C) are also incorporated in the UV curable powders to initiate photopolymerization of the ethylenically unsaturated compounds. Examples of suitable alpha cleavage photoinitiators include benzoin, benzoin ethers, benzyl ketals, such as benzyl dimethyl ketal, acyl phosphines, such as diphenyl (2,4,6-trimethyl benzoyl) phosphine oxide, aryl ketones, such as 1-hydroxy cyclohexyl phenyl ketone, etc. Examples of suitable hydrogen abstraction photoinitiators include Michler's ketone, etc. Examples of suitable cationic photoinitiators include diaryliodonium salts and copper synergists, etc. Usually the amount of photoinitiator present ranges between about 0.1 and 10 phr, and preferably between about 1 and 5 phr.

In accordance with this invention, in order to reduce or eliminate hazing and maintain a consistent smooth glossy appearance when the powder coating, after having been melted and flowed out for curing, is cured in the molten state at temperatures below the normal recrystallization temperature of the crystalline resin component supplied by A) or B), preferably supplied by B), a recrystallization inhibitor D) is employed in the resin system of the powder composition. In general, the recrystallization inhibitor D) comprises another crystalline resin that is mutually compatible with the co-reactive generally incompatible crystalline and non-crystalline resins supplied by A) and B). When incorporated in the powder composition, it has been found that the recrystallization inhibitor effectively reduces the rate at which the crystalline resin recrystallizes out of the molten powder coating and thereby prevents hazing in the coating formed therefrom.

The recrystallization inhibitors D) of particular interest herein are solid materials as well. More particularly, this material is a solid crystalline oligomer having moieties that are compatible with both the co-reactive non-crystalline and crystalline materials supplied by A) and B). The crystalline oligomer typically has a weight average (Mw) molecular weight ranging between about 200 and 1,000, and preferably between about 300 and 800. The melting point (Tm) should also fall within the range described above for crystalline materials, i.e., a Tm higher than the Tg of the non-crystalline resins, and preferably higher than 180° F. up to about 300° F. It may also contain unsaturated groups which participate in UV curing, although it typically does not.

In a preferred embodiment, where the non-crystalline resin is an unsaturated polyester base resin A) and the crystalline resin is a vinyl ether terminated urethane crosslinker resin B), the recrystallization inhibitor D) is preferably a crystalline oligomer that contains one or more moieties compatible with the relatively polar non-crystalline unsaturated polyester, such as an aryl, e.g., benzyl, substituted aryl, sulfone, ether, glycidyl ether, hydroxyl, ester, and the like which render component D) compatible with the base resin A), and an aliphatic crystalline backbone and a molecular weight (Mw) close to that of the crystalline crosslinker resin B) which render component D) compatible with the crystalline crosslinker resin B).

Most preferably, the recrystallization inhibitor D) is comprised of a crystalline epoxy oligomer that has by definition a glycidyl ether moiety and may contain other moieties listed above as well. It may further contain unsaturated functionalities, although typically only saturated functionalities are present. Preferably, the molecular weight (Mw) of these crystalline epoxy oligomers is less than 800. Crystalline epoxy resins of the aforesaid character can be prepared by well known techniques, such as by the glycidylation of an alcohol containing the aforesaid functional groups and known to have limited rotation with epichlorohydrin. Examples of suitable crystalline epoxy resins useful in the practice of this invention include, but are not limited to, tetramethylbisphenol diglycidyl ether, triglycidyl isocyanurate, dihydroxydiphenyl sulfone diglycidyl ether (bisphenol S diglycidyl ether), 2,5-di-t-butylbenzene-1,4-diglycidyl ether, diglycidyl isophthalate, epoxypropoxydimethyl-benzylacrylamide, hydroquinone digylcidyl ether, 2,5-di-t-butylhydroquinone diglycidyl ether, and terephthalic acid diglycidyl ester, etc.

As discussed above, it is also possible to supply the recrystallization inhibitor D) with unsaturated groups which will participate in the UV curing reaction which proceeds primarily through the unsaturated groups. An example of a suitable co-reactive recrystallization inhibitor includes a crystalline vinyl ether containing one or more of the aforesaid moieties such as butanol-4-ethylenyl-oxy-benzoate.

While not wishing to be bound by any particular theory, it is believed that the recrystallization inhibitor reduces the rate of recrystallization of the other crystalline component. This occurs after the powder is melted for curing by making the other crystalline component more compatible with the non-crystalline resin. In this more compatible blend, all of the crystalline resin species separate and recrystallize out of the molten coating powder slower and less completely than they do in the absence of the recrystallization inhibitor.

The amount of recrystallization inhibitor D) employed will, of course, depend on the amount of reactive crystalline resin contained in the UV curable powder composition. The amount generally ranges between about 0.1 and 100 wt. % of the total amount of crystalline resin supplied from A) or B), and preferably between about 1 and 50 wt. %.

Other ingredients such as standard catalysts may also be employed to increase the crosslinking rate, such as transition metal compounds based on a fatty acid or oil, or tertiary amines. Cobalt soaps, such as cobalt octoate, cobalt neodecanoate, cobalt naphthenate, and cobalt octadecanoate, are especially preferred. If employed, the amount of catalyst present is typically less than about 1.0 phr, and preferably ranges between about 0.1 and 0.5 phr.

In addition, thermal free-radical initiators, such as organic peroxide and azo compounds, in conjunction with the photoinitiators can also be employed. The presence of thermal initiators alongside photoinitiators has been found to assist in curing down near the substrate, particularly when pigmented, opaque, or thicker film coatings are desired. Examples of suitable peroxide and azo initiators include diacyl peroxides, such as benzoyl peroxide, azobis (alkyl nitrile) peroxy compounds, peroxy ketals, such as 1,1-bis(t-butyl peroxy)-3,3,5-trimethylcyclohexane, peroxy esters, dialkylperoxides, hydroperoxides, ketone peroxides, etc. If employed, the amount of thermal initiator present usually ranges between about 0.1 and about 10 phr, and preferably between about 1 and 5 phr.

Common additives such as pigments and fillers, flow control agents, dry flow additives, anticratering agents, surfactants, texturing agents, light stabilizers, etc., can be used as well. For instance, the UV curable powders made in accordance with this invention can be clear coats (i.e., unpigmented and unfilled) or contain up to about 200 phr, usually up to about 120 phr, of traditional fillers and/or pigments for desired opacity and/or coloration. Examples of suitable fillers include calcium carbonate, barium sulfate, wollastonite, mica, china clay, diatomaceous earth, benzoic acid, low molecular weight nylon, etc. Examples of suitable pigments include inorganic pigments, such as titanium dioxide, and organic pigments, such as carbon black, etc. The other common additives mentioned above are typically present in a total amount up to about 15 phr. Examples of typical flow control agents include acrylic resins, silicone resins, etc. Examples of typical dry flow additives include fumed silica, alumina oxide, etc. Examples of typical anti-cratering agents include benzoin, benzoin derivatives, low molecular weight phenoxy and phthalate plasticizers, etc. Examples of typical surfactants include acetylenic diol, etc. Examples of typical texturing agents include organophilic clays, crosslinked rubber particles, multiple crosslinkers, etc. Examples of typical light stabilizers include hindered amines, hindered phenols, etc.

The UV curable coating powders employed in this invention are produced by conventional melt-blending techniques. The components are dry blended together, and then melt blended in a single screw or twin screw extruder with heating above the melting of the resin system. The extruded composition is rapidly cooled and broken into chips, ground in a mill with cooling, and, as necessary, the particulates are sorted according to size. Average particle size is typically between about 20–60 microns. Gaseous or supercritical carbon dioxide may be charged to the extruder to lower extrusion temperatures. This is particularly desirable with powders containing crystalline resins. These powders tend to experience drastic reductions in viscosity above the melting point (Tm) of the crystalline materials, which, in turn, undesirably reduces the amount of shearing and mixing action occurring in the extruder, leads to longer processing time while waiting for the crystalline materials to recrystallize and the powder to harden, and also reduces the shelf stability of the powder produced due to destruction of crystal structures. Thus, extrusion is preferably carried out at temperatures above the Tg the non-crystalline resins but below the Tm of the crystalline components for efficient melt-processing and desired storage stability.

Once the dry, free-flowing, UV curable powders containing the crystalline resins are produced, they are ready for application onto a substrate to be coated.

The UV curable powders are applied in the usual fashion, e.g., electrostatically, to the substrate. Usually electrostatic spray booths are employed which house banks of corona discharge or triboelectric spray guns and a reclaim system for recycling the overspray powders into the powder feed. The applied powders are next exposed to sufficient amount of heat to melt and flow out into a continuous, smooth, molten film over the substrate. The substrate may be heated at the time of application (pre-heated) and/or subsequently (post-heated) to effect melting and flow out. Heating can be performed in infrared, convection ovens, or a combination of both, although infrared ovens are preferred.

In the initial melting stage, the UV curable powders employed in this invention have the ability to melt and flow out into exceptionally smooth films very rapidly (e.g., in about 5–190 seconds) at very low melting temperatures (e.g., between 170–300° F.), making these powders suited for coating a plurality of heat sensitive substrates. Usually, the flow viscosity is also very low (e.g., around 100–4,000 cone and plate) which helps to produce extraordinarily smooth coatings at the desired flow temperatures.

Immediately following melting and flow out of the powders, the molten powder coating is exposed to UV light, which, in an almost instant, cures and hardens the film into an attractive, durable, haze-free, uniformly smooth and glossy coating across the entire substrate. Standard UV light sources are suitable for curing the coating, such as standard medium pressure mercury-, iron doped mercury-, and/or gallium doped mercury-vapor lamps, e.g., 600-watt Fusion H-, D- and/or V-lamps. Electron beam radiation may be used instead of UV radiation, if desired. Hardening of the coating takes between about 1 millisecond and 10 seconds, and typically less than about 3 seconds. The coating thickness that can be obtained is typically between about 0.5 and 25 mils, and more commonly between about 1 and 10 mils.

The glossiness of the cured coating (measured on a 60° Gardner Haze-Gloss scale) is desirably about 50 or above, preferably about 70 or above, with no visually significant drop off in the level of gloss and smoothness across the film when cured at temperatures which the crystalline ingredient supplied by A) or B) would normally separate and recrystallize out in the absence of the recrystallization inhibitor D).

The UV curable powder coatings employed in this invention are particularly suited for heat sensitive substrates. They are also suited for traditional heat resistant substrates. Examples of typical heat sensitive substrates include wood, such as hardwood, hard board, laminated bamboo, wood composites, such as particle board, electrically conductive particle board, high, medium or low density fiber board, masonite board, laminated bamboo, and other substrates that contain a significant amount of wood. These substrates may be filled or primed with UV liquids, powder primers, or solvent- or waterborne coatings to improve smoothness and reduce the required film builds. Other heat sensitive substrates include plastics, such as ABS, PPO, SMC, polyolefins, polycarbonates, acrylics, nylons and other copolymers which usually will warp or outgas when coated and heated with traditional heat curable powders, along with paper, cardboard, and heat resistant composites and components having a heat sensitive aspect, and especially those which have a variable mass, etc. Examples of typical heat resistant substrates, include metal, steel, other alloys, glass, ceramic, carbon and graphite.

This invention will now be described in greater detail by way of specific examples.

EXAMPLES 1–2

Curing of UV Curable Unsaturated Polyester Powder Coatings

The following ingredients were blended and extruded together in the manner given to produce UV curable powder coatings according to this invention that are capable of forming a consistent haze-free smooth glossy finish when UV cured at variable high and low temperatures, along with a traditional UV curable powder coating that is not capable of such results which serves as the control.

| | | PHR | |
|---|---|---|---|
| INGREDIENTS | CONTROL | EXAMPLE 1 | EXAMPLE 2 |
| DRY BLEND UNTIL HOMOGENEOUS | | | |
| Uralac XP-3125[1] (Non-Crystalline) | 80 | 80 | 80 |
| Uralac ZW-3307P[2] (Crystalline) | 20 | 20 | 20 |

-continued

| | | PHR | |
|---|---|---|---|
| INGREDIENTS | CONTROL | EXAMPLE 1 | EXAMPLE 2 |
| Epon RSS-1407[3] (Crystalline) | — | 5 | — |
| Ciba RD 97-275[4] (Crystalline) | — | — | 5 |
| Lucerin TPO[5] | 2 | 2 | 2 |
| Resiflow P-67[6] | 2 | 2 | 2 |
| Shepard Black[7] | 6 | 6 | 6 |
| CHARGE TO EXTRUDER AND EXTRUDE AT MELT TEMPERATURE OF 180° F. AIR COOL EXTRUDATE AND BREAK INTO CHIPS AND THEN ADD | | | |
| Aluminum Oxide C[8] | 0.2% | 0.2% | 0.2% |
| CHARGE TO MILL AND GRIND TO POWDER SCREEN TO −140 MESH | | | |

Table Footnotes

[1] Uralac XP 3125 is a solid, amorphous, unsaturated polyester resin that is believed to be based on fumaric or maleic acid, terephthalic acid, and 1,6-hexanediol, sold by DSM Resins. The resin individually has a Tg of about 125° F.
[2] Uralac ZW-3307P is a solid, crystalline, divinyl ether urethane crosslinker resin that is believed to be based on hexamethylene diisocyanate and 4-hydroxybutyl vinyl ether, sold by DSM Resins. The resin individually has a Tm of about 223° F. and a recrystallization point of about 176° F.
[3] Epon RSS-1407 is a crystalline epoxy resin composed of tetramethyl bisphenol diglycidyl ether, sold by Shell Chemical. The resin individually has a Tm of about 221° F.
[4] Ciba RD 97-275 is a crystalline epoxy resin composed of bisphenol S diglycidyl ether, sold by Ciba Polymers. The resin individually has a Tm of about 257° F.
[5] Lucerin TPO is a solid photoinitiator composed of diphenyl (2,4,6-trimethylbenzoyl) phosphine oxide, sold by BASF.
[6] Resiflow P-67 is a solid acrylic flow control agent, sold be Estron Chemical.
[7] Shepard Black is a black spinel copper chromite pigment, sold by Shepard Color.
[8] Aluminum Oxide C is a dry flow additive composed of aluminum oxide, sold by Degussa.

Each powder formulation above was electrostatically applied by a corona discharge spray gun onto two separate steel panels that had been pre-heated to different temperatures, i.e., 170° F. and 250° F. The panels were coated at these two temperatures to simulate what happens on a heat sensitive part which has both thin and thick sections which heat up to different temperatures depending on the mass of the part. The applied powders were then allowed to fuse as a result of the residual heat given off by the pre-heated until a smooth continuous molten coating film had been formed. Immediately after fusion, while the film was still molten, the panels were cured by exposure to UV radiation. The cured coatings all had a film thickness of between 2.2–3.0 mils. The coating conditions and performance results are given in the Table below.

| | CONTROL | | EXAMPLE 1 | | EXAMPLE 2 | |
|---|---|---|---|---|---|---|
| Pre-heat (15 minutes) | 175° F. | 250° F. | 175° F. | 250° F. | 175° F. | 250° |
| Powder Application | 100 kV Corona Gun | | 100 kV Corona Gun | | 100 kV Corona Gun | |
| UV Cure (1 second) | 600 Watt D-Lamp | | 600 Watt D-Lamp | | 600 Watt D-Lamp | |
| Substrate | Q-Panel | | Q-Panel | | Q-Panel | |
| Coating Temperature at UV Cure | 170° F. | 242° F. | 168° F. | 241° F. | 168° F. | 242° F. |
| Haziness | Hazy Mottled | No Haze | No Haze | No Haze | No Haze | No Haze |
| Smoothness | Textured | No Orange Peel | Heavy Orange Peel | No Orange Peel | Heavy Orange Peel | Slight Orange Peel |
| 60° Gloss | 72 | 90 | 82 | 94 | 77 | 94 |
| MEK Resistance (50 Double Rubs) | Slight Rub Off | No Rub Off | No Rub Off | No Rub Off | No Rub Off | No Rub Off |

The above results confirm that incorporation of a more compatible crystalline resin into the powder composition alongside the crystalline crosslinker resin prevents a haze from visibly developing on the surface of the coating upon being cured at temperatures at which the crystalline crosslinker resin would normally recrystallize out in absence of the other crystalline ingredient. This enables production of cured coatings with a more consistent smooth glossy appearance especially over a variable mass, heat sensitive part despite having sections of the part cured at different temperatures above and below the usual recrystallization temperature.

EXAMPLE 3

Curing of UV Curable Unsaturated Acrylated Polyester Powder Coatings

The following ingredients were blended and extruded together in same manner as provided in Examples 1–2 to produce another UV curable powder coatings according to this invention that is capable of forming a consistent haze-free smooth glossy finish when UV cured at both high and low temperatures, along with a traditional UV curable powder coating that is not capable of such results which serves as the control.

| | PHR | |
|---|---|---|
| INGREDIENTS | CONTROL | EXAMPLE 3 |
| Crylcoat E5252[1] (Non-Crystalline) | 80 | 80 |
| Uralac ZW-3307P (Crystalline) | 20 | 20 |
| Epon RSS-1407 (Crystalline) | — | 5 |

-continued

| INGREDIENTS | PHR | |
|---|---|---|
| | CONTROL | EXAMPLE 3 |
| Lucerin TPO | 2 | 2 |
| Resiflow P-67 | 2 | 2 |
| Shepard Black | 6 | 6 |
| Aluminum Oxide C | 0.2% | 0.2% |

Table Footnote
[1]Crylcoat E5252 is a solid, amorphous, unsaturated acrylated polyester resin. The resin individually has a Tg of about 140° F.

Each powder formulation was tested in the same manner as provided in Examples 1–2. The coating conditions and performance results are given in the Table below.

| | CONTROL | | EXAMPLE 3 | |
|---|---|---|---|---|
| Pre-heat (15 minutes) | 175° F. | 250° F. | 175° F. | 250° |
| Powder Application | 100 kV Corona Gun | | 100 kV Corona Gun | |
| UV Cure (1 second) | 600 Watt D-Lamp | | 600 Watt D-Lamp | |
| Substrate | Q-Panel | | Q-Panel | |
| Coating Temperature at UV Cure | Generally Same As In Examples 1–2 | | Generally Same As In Examples 1–2 | |
| Haziness | Very Hazy | Slight Very Haze Mottled | No Haze | No Haze |
| Smoothness | Slight Orange Peel | No Orange Peel | Moderate Orange Peel | No Orange Peel |
| 60° Gloss | 24 | 86 | 66 | 86 |
| MEK Resistance (50 Double Rubs) | Slight Rub Off | No Rub Off | Slight Rub Off | No Rub Off |

From the foregoing it will be seen that this invention is one well adapted to attain all ends and objects hereinabove set forth together with the other advantages which are apparent and inherent. Since many possible variations may be made of the invention without departing from the scope thereof, the invention is not intended to be limited to the embodiments and examples disclosed, which are considered to be purely exemplary. Accordingly, reference should be made to the appended claims to assess the true spirit and scope of the invention, in which exclusive rights are claimed.

What is claimed is:

1. A non-hazing UV curable powder coating composition, which comprises a film-forming particulate blend of: A) an unsaturated base resin; B) an unsaturated crosslinker resin co-polymerizable with the base resin; and, C) a photoinitiator, wherein the combination of components A) plus B) comprises a blend of a crystalline resin and a non-crystalline resin, and wherein the composition further comprises D) a recrystallization inhibitor comprising another crystalline resin that reduces or eliminates hazing in the cured coating formed from the powder composition.

2. The composition of claim 1, wherein the base resin A) comprises a non-crystalline unsaturated polyester resin, the crosslinker resin B) comprises a crystalline unsaturated oligomer having one or more vinyl ether, vinyl ester, allyl ether, allyl ester, acrylate or methacrylate groups co-polymerizable with the base resin, and the recrystallization inhibitor D) comprises a crystalline oligomer having one or more aryl, sulfone, ether, glycidyl ether, hydroxyl, or ester groups.

3. The composition of claim 1, wherein the base resin A) comprises non-crystalline unsaturated polyester resin with maleate or fumarate unsaturations and a Tg of about 90° F. up to about 150° F., the crosslinker resin B) comprises a crystalline vinyl ether terminated urethane oligomer with a Tm of about 180° F. up to about 300° F., and the recrystallization inhibitor D) comprises a crystalline epoxy oligomer with a Tm of about 180° F. up to about 300° F.

4. The composition of claim 3, wherein the recrystallization inhibitor is selected from the group consisting of tetramethylbisphenol diglycidyl ether, triglycidyl isocyanurate, bisphenol S diglycidyl ether, 2,5-di-t-butylbenzene-1,4-diglycidyl ether, diglycidyl isophthalate, epoxypropoxy-dimethylbenzylacrylamide, hydroquinone digylcidyl ether, 2,5-di-t-butyl hydroquinone diglycidyl ether, and terephthalic acid diglycidyl ester.

5. The composition of claim 3, wherein the recrystallization inhibitor is tetramethyl bisphenol diglycidyl ether.

6. The composition of claim 3, wherein the recrystallization inhibitor is bisphenol S diglycidyl ether.

7. The composition of claim 3, wherein the crystalline vinyl ether oligomer crosslinker is employed at a stoichiometric equivalent amount relative to said non-crystalline unsaturated polyester base resin of between about 0.5 and 1.5.

8. The composition of claim 7, wherein the crystalline epoxy oligomer recrystallization inhibitor is employed in an amount between about 0.1 and 100 wt. % relative to the total amount of crystalline resin supplied by B).

9. The composition of claim 1, wherein the recrystallization inhibitor is employed in an amount of between about 0.1 and 100 wt. % relative to the total amount of crystalline resin supplied by A) or B).

10. The composition of claim 1, wherein powder composition after being melted and flowed out can be cured in its molten state at temperatures as low as about 170° F. without having the crystalline materials recrystallize to visually significant levels.

11. The composition of claim 10, wherein the cured coating has a uniform 60° Gardner-Haze Gloss of about 50 or above.

12. A non-hazing UV curable powder coating composition, which comprises a film-forming particulate blend of: A) a non-crystalline unsaturated polyester resin with a Tg of about 90° F. up to about 150° F.; B) a crystalline vinyl ether functionalized crosslinker resin with a Tm of about 180° F. up to about 300° F. co-polymerizable with the unsaturated polyester resin; C) a photoinitiator; and D) a recrystallization inhibitor comprising a crystalline epoxy resin with a Tm of about 180° F. up to about 300° F., wherein incorporation of the recrystallization inhibitor D) reduces or eliminates hazing in the cured coating formed therefrom.

13. The composition of claim 12, wherein the recrystallization inhibitor is free of unsaturated functional groups.

14. The composition of claim 12, wherein the recrystallization inhibitor is selected from the group consisting of tetramethylbisphenol diglycidyl ether, triglycidyl isocyanurate, bisphenol S diglycidyl ether, 2,5-di-t-butylbenzene-1,4-diglycidyl ether, diglycidyl isophthalate, epoxypropoxy-dimethylbenzylacrylamide, hydroquinone digylcidyl ether, 2,5-di-t-butyl hydroquinone diglycidyl ether, and terephthalic acid diglycidyl ester.

15. The composition of claim 14, wherein the recrystallization inhibitor is tetramethyl bisphenol diglycidyl ether.

16. The composition of claim 14, wherein the recrystallization inhibitor is bisphenol S diglycidyl ether.

17. The composition of claim 14, wherein the base resin is an unsaturated polyester with fumarate, maleate unsaturations, or acrylic unsaturations and the crosslinker resin is a vinyl ether terminated urethane oligomer.

18. The composition of claim 12, wherein the crystalline vinyl ether crosslinker is employed in a stoichiometric equivalent amount relative to said unsaturated polyester base resin of between about 0.5 and 1.5.

19. The composition of claim 18, wherein the crystalline epoxy resin recrystallization inhibitor is employed in an amount between about 0.1 and 100 wt. % relative to the total amount of crystalline resin supplied by B).

20. The composition of claim 12, wherein powder composition after being melted and flowed out can be cured in its molten state at temperatures as low as about 170° F.

without having the crystalline materials recrystallize to visually significant levels.

21. A substrate having coated and cured thereon the powder coating composition of claim 1.

22. A heat sensitive substrate having coated and cured thereon the powder coating composition of claim 1.

\* \* \* \* \*